(12) United States Patent
Mason et al.

(10) Patent No.: US 7,607,836 B2
(45) Date of Patent: Oct. 27, 2009

(54) SEAL FOR RAILWAY CAR JOURNAL BEARING

(75) Inventors: Michael Allan Mason, Richmond, VA (US); David Wayne Shannon, Richmond, VA (US); Paul Adams Hubbard, Richmond, VA (US); Andrew James Sklute, Chester, VA (US); Kurt Winfield Fisher, Calgary (CA)

(73) Assignee: AMSTED Rail Company, Inc, Granite City, IL (US)

( * ) Notice: Subject to any disclaimer, the term of this patent is extended or adjusted under 35 U.S.C. 154(b) by 385 days.

(21) Appl. No.: 11/724,696

(22) Filed: Mar. 16, 2007

(65) Prior Publication Data

US 2008/0226212 A1   Sep. 18, 2008

(51) Int. Cl.
  *F16C 33/80* (2006.01)
  *F16C 33/78* (2006.01)

(52) U.S. Cl. .................. 384/480; 384/484

(58) Field of Classification Search ........... 384/459, 384/477, 480, 484; 277/351, 356, 411, 412, 277/565, 571
See application file for complete search history.

(56) References Cited

U.S. PATENT DOCUMENTS

| | | | | |
|---|---|---|---|---|
| 3,741,614 A | * | 6/1973 | Judge | 384/459 |
| 4,438,990 A | * | 3/1984 | Schalk et al. | 384/480 |
| 5,380,102 A | * | 1/1995 | Sink | 384/484 |
| 5,975,533 A | * | 11/1999 | Hubbard et al. | 277/351 |

* cited by examiner

*Primary Examiner*—Thomas R Hannon
(74) *Attorney, Agent, or Firm*—Edward J. Brosius

(57) ABSTRACT

A bearing assembly is provided having a roller bearing with an inner raceway fitted around the journal portion of an axle. An outer raceway combines with the inner raceway to receive roller elements. A backing ring is centered to the shaft fillet. An annular wear ring is positioned between the inner race and the backing ring. An improved lubricant seal arrangement is provided between the wear ring and the supporting outer raceway.

23 Claims, 3 Drawing Sheets

SEAL FOR RAILWAY CAR JOURNAL BEARING

BACKGROUND OF THE INVENTION

This invention relates to sealed shaft journal bearings and more particularly to an improved bearing assembly seal arrangement.

Roller bearing assemblies incorporating two rows of tapered roller bearings preassembled into a self-contained, pre-lubricated package for assembly onto journals at the ends of axles or shafts are known. Such bearing assemblies are used as rail car bearings assembled onto journals at the ends of the car axles. Bearings of this type typically employ two rows of tapered roller bearings fitted one into each end of a common bearing cup with their respective bearing cones having an inner diameter dimensioned to provide an interference fit with the shaft journal and with a cylindrical sleeve or spacer positioned between the cones providing accurate spacing and proper lateral clearance on the journal. Seals mounted within each end of the bearing cup provide sealing contact with wear rings bearing against the outer ends or back face of the respective bearing cones at each end of the assembly. Such seals are shown in U.S. Pat. No. 5,975,533.

In a typical rail car installation, the axle journal is machined with a fillet at the inboard end, and a backing ring having a surface complementary to the contour of the fillet and an abutment surface for engaging the inboard end of the inner wear ring accurately positions the bearing assembly on the journal. An end cap mounted on the end of the axle by bolts threaded into bores in the end of the axle engages the outboard wear ring and clamps the entire assembly on the end of the axle. The wear rings typically have an inner diameter dimensioned to provide an interference fit with the journal over at least a portion of their length so that the entire assembly is pressed as a unit onto the end of the journal shaft.

SUMMARY OF THE INVENTION

The bearing assembly of the present invention is a roller bearing that includes an inner race or cone fitted around the journal portion of the axle or shaft. The inner race includes an outwardly directed raceway. An outer race or cup has an inwardly directed raceway. Roller elements are located between and contacting the inner and outer raceways.

A backing ring has a contoured surface complementary to and engaging the contoured surface of a fillet formed on the shaft. The fillet leads from the journal to the shoulder of the shaft. The contoured surfaces cooperate to fix the backing ring against axial movement along the shaft.

The bearing assembly includes a seal assembly that provides a barrier for lubricant to be retained within the seal assembly and for contaminants to be kept out. The seal assembly includes a stator apprised to the seal section itself and a rotor affixed to a wear ring. The inter-related relationship between the seal section, stator and rotor act to retain the lubricant within the seal assembly and to keep contaminants out.

DESCRIPTION OF THE PREFERRED EMBODIMENTS

Figure 1:
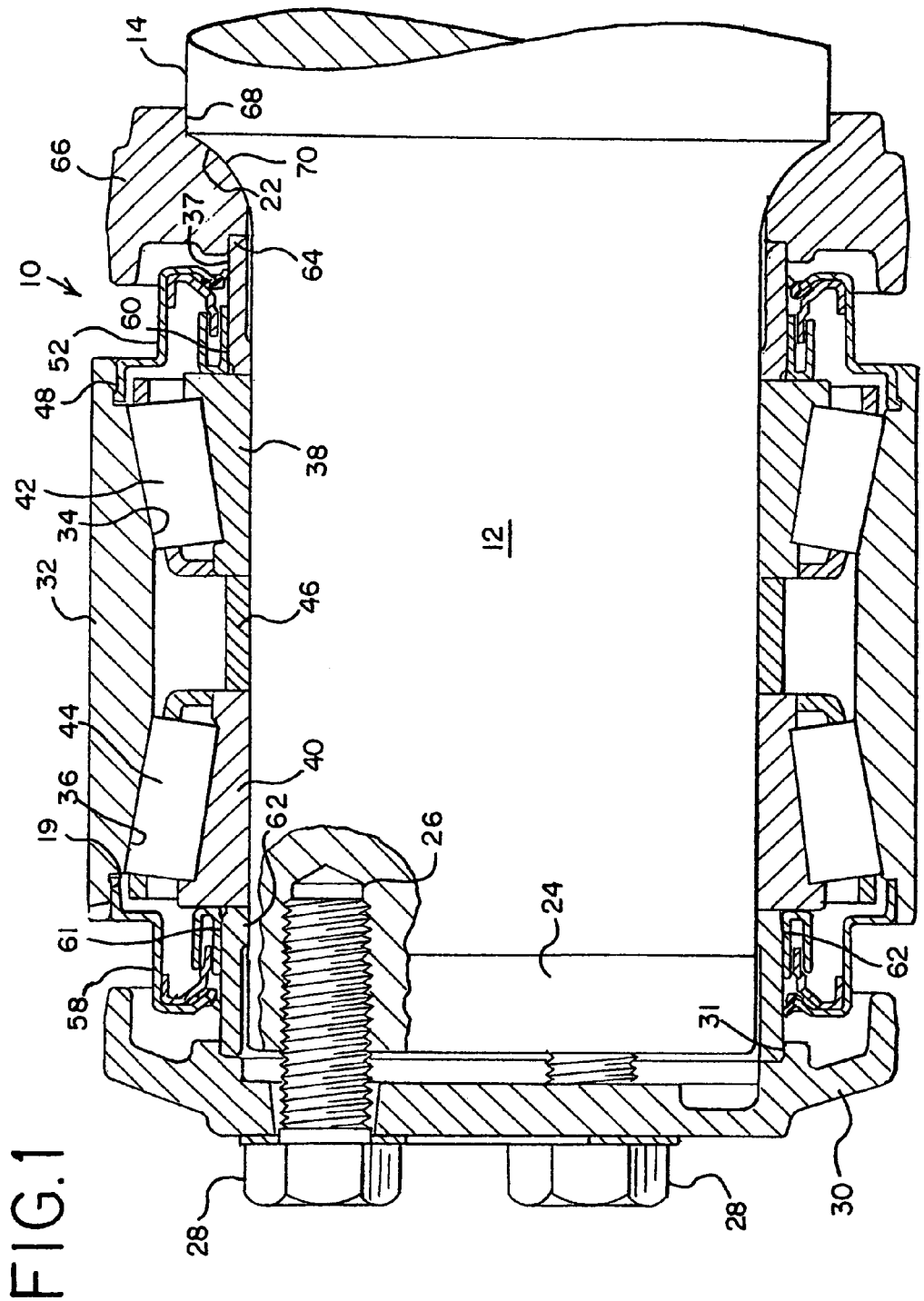
FIG. 1 is a sectional view of a shaft journal having mounted thereon a tapered roller bearing assembly in accordance with an embodiment of the present invention.

Referring now to FIG. 1 of the drawings, a bearing assembly indicated generally by the reference numeral 10 on FIG. 1 is shown mounted on a journal 12 on the free, cantilevered end of a shaft or axle 14, typically a rail car axle. Journal 12 is machined to very close tolerances and terminates at its inner end in a contoured fillet 22 leading to a cylindrical shoulder 18 of axle 14. At the free end of the axle, journal portion 12 terminates in a slightly conical or tapered guide portion 24 dimensioned to facilitate installation of the bearing assembly onto the journal. A plurality of threaded bores 26 are formed in the end of axle 14 for receiving threaded cap screws, or bolts 28 for mounting a bearing retaining cap 30 on the end of the shaft to clamp the bearing in position as described more fully herein below.

The bearing assembly 10 is preassembled before being mounted and clamped on journal 12 by cap 30 and bolts 28. The bearing assembly includes a unitary bearing cup or outer raceway 32 having a pair of raceways 34, 36 formed one adjacent each end thereof which cooperate with a pair of bearing cones 38, 40, respectively, to support the two rows of tapered rollers 42, 44, respectively, therebetween. A center spacer 46 is positioned between cones 38, 40 to maintain the cones in accurately spaced position relative to one another allowing for proper bearing lateral clearance.

The bearing cup 32 is provided with cylindrical counterbores 17,19 at its opposite ends outward of the raceways 34, 36, and a pair of seal sections 52, 58 are pressed one into each of the cylindrical counterbores 17,19 in cup 32. Each seal section 52, 58 includes resilient sealing elements which rub upon and form a seal with surfaces 37,61 of a pair of seal wear rings 60, 62, having an inwardly directed end in engagement with the outwardly directed ends of bearing cones 38, 40, respectively. Seal section 58 is similar to seal section 52 and will not be described in detail. The other end of wear ring 60 is received in a cylindrical counterbore 64 in the axially outwardly directed end of an annular backing ring 66 which, in turn, has a counterbore 68 at its other end which is dimensioned to be received in interference and non-interference relation on the cylindrical shoulder 18 of shaft 14. The counterbore 64 and the outer diameter of wear ring 60 are also dimensioned to provide an interference fit so that wear ring 60 is pressed into the backing ring 66 which is accurately machined to provide a contoured inner surface 70 complementary to and engaging the contour of fillet 22 when the bearing is mounted on the shaft. The outwardly directed end of wear ring 62 bears against a counterbore 31 in retaining cap 30.

Figure 2:
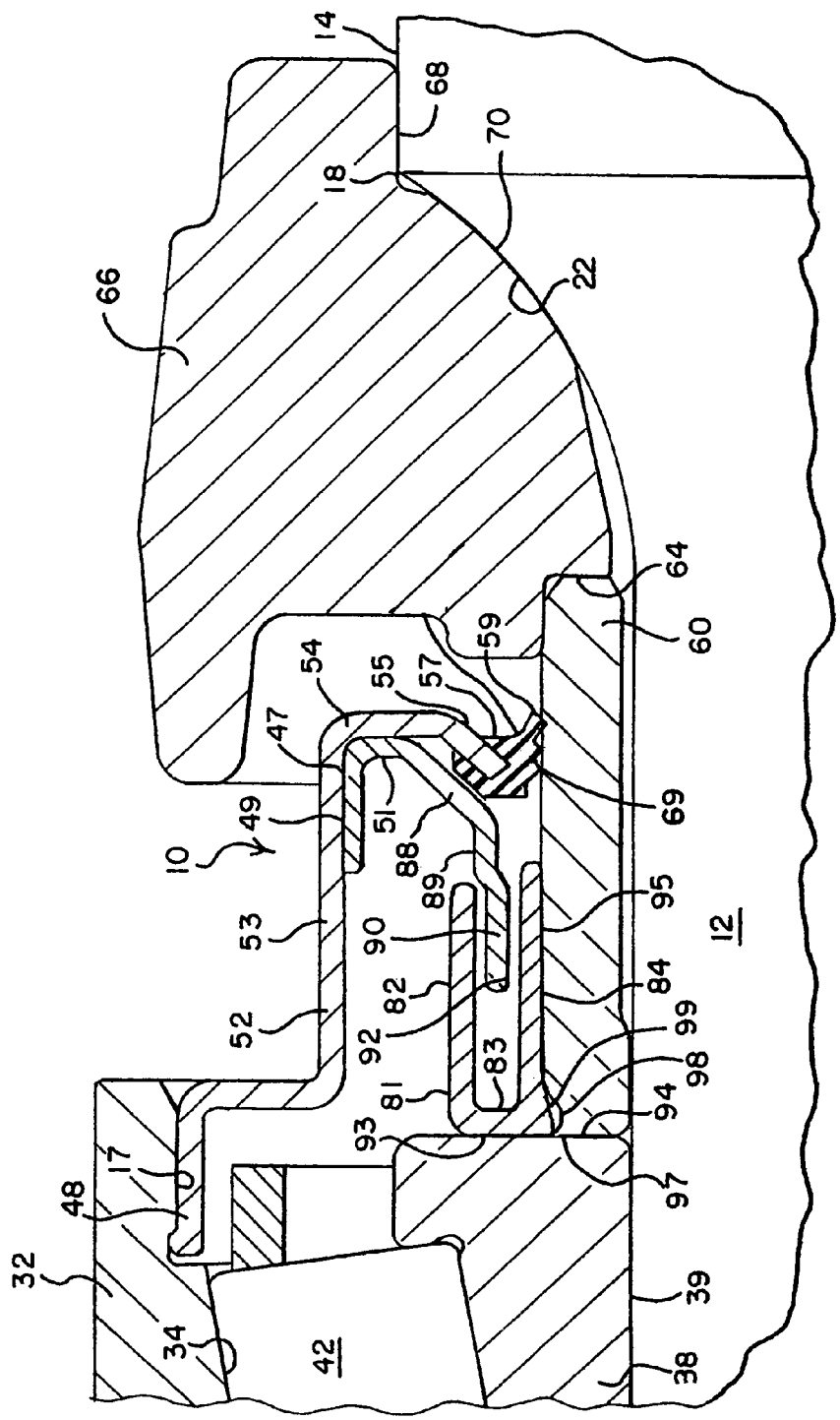
FIG. 2 is a detailed partial view in cross section of a tapered roller bearing seal assembly in accordance with a first embodiment of the present invention.

Referring now to FIG. 2, a detailed view of seal assembly portion of bearing assembly 10 is provided. Seal section 52 is seen to comprise a generally circular piece, having a larger diameter end section 48 pressed or fit into a complementary counterbore 17 in cup 32. Seal section 52 includes a main cylindrical section 53 that extends parallel to end section 48, wherein main cylindrical section 53 has a smaller diameter than end section 48.

An inner circular section 54 is normal to main cylindrical section 53 and extends inwardly toward wear ring 60. Distal end 55 of seal section 52 extends from inner circular section 54 at an acute angle thereto. Resilient sealing element 57 is fitted onto distal end 55. Resilient sealing element 57 is comprised of a rubber or elastomer compound, such as Nitrile rubber compound. Resilient sealing element 57 includes a main section that includes an opening to receive distal end 55 of seal assembly 52. Resilient sealing element 57 also includes base circular contact rib 59 that is laterally spaced from two base ribs 69. Accordingly, a space exists between end contact rib 59 and base contact ribs 69.

A stator 47 is a generally cylindrical piece, having an outer section 49 of a larger diameter. The outer surface of outer section 49 is affixed by welding, gluing, dimpling, interference fit, or other appropriate method to an inner surface of main cylindrical section 53 of seal assembly 52. Stator 47 also includes first intermediate section 51 that extends from outer section 49 parallel to section 54 of seal case 52, second intermediate section 88 that extends at an acute angle from first intermediate section 51, and inner section 90 that extends from second intermediate section 88. Note that in the preferred embodiment of FIG. 2, first intermediate section 51 of stator 47 is adjacent inner cylindrical section 54 of seal section case 52. Second intermediate section 88 is also seen to pass adjacent a complimentary shaped section of resilient sealing element 57. A third intermediate section 89 is present in stator 47; third intermediate section 89 is stepped from second intermediate section 88 to inner section 90 and assists in ease of assembly. Inner section 90 of stator 47 is seen to extend parallel to outer surface 37 of wear ring 60. Inner section 90 is seen to end at end section 92.

Rotor 81 is seen to be a generally cylindrical piece having an outer section 82 of a larger diameter. Intermediate section 83 extends from outer section 82 and is generally normal thereto. Intermediate section 83 includes a generally flat outer section 93 that is fitted against a complementary flat surface 94 of bearing cone 38. Inner section 84 of rotor 81 extends from intermediate section 83 and is generally normal thereto. Inner section 84 of rotor 81 has an outer surface 95 which is fitted against outer surface 37 of wear ring 60.

Outer surface 95 of rotor 81 is welded, glued, or interference fitted to outer surface 37 of wear ring 60. A bead or rib 97 or other affixing media can be located at inner section 84 of rotor 81 to affix to outer surface 37 of wear ring 60. Chamfer 98 in outer surface 37 of wear ring 60 aids the bead or rib 97 with location to outer surface 37. The combination and configuration of seal section 52, stator 47 and rotor 81 assist in retaining lubricant within the seal assembly. As rotor 81 inner section 84 and outer section 82 rotate about stator 47 inner section 90, the path required for lubricant to escape from within the seal assembly is torturous. Preferably, stator 47 inner section 90 extends a minimum of about halfway into the channel formed by rotor outer section 82 and inner section 84, but such extension could be from 25% to 75% or more. The presence of resilient sealing element 57 further restricts the lubricant from exiting the seal assembly. The preferred spacing between rotor 81 section 84 and stator 47 section 90 is a nominal (0.076 cm) 0.030 inch and between stator 47 section 90 and rotor 81 outer section 82 is a nominal (0.076 cm) 0.030 inch. It should be understood that seal section 52 itself is normally comprised of a suitable steel, as are rotor 81 and stator 47. However, it is within the scope of the present invention to have one or more of seal section 52, rotor 81 or stator 47 comprised of an engineered plastic polymer or thermoplastic such as polyester or composite material.

Figure 3:
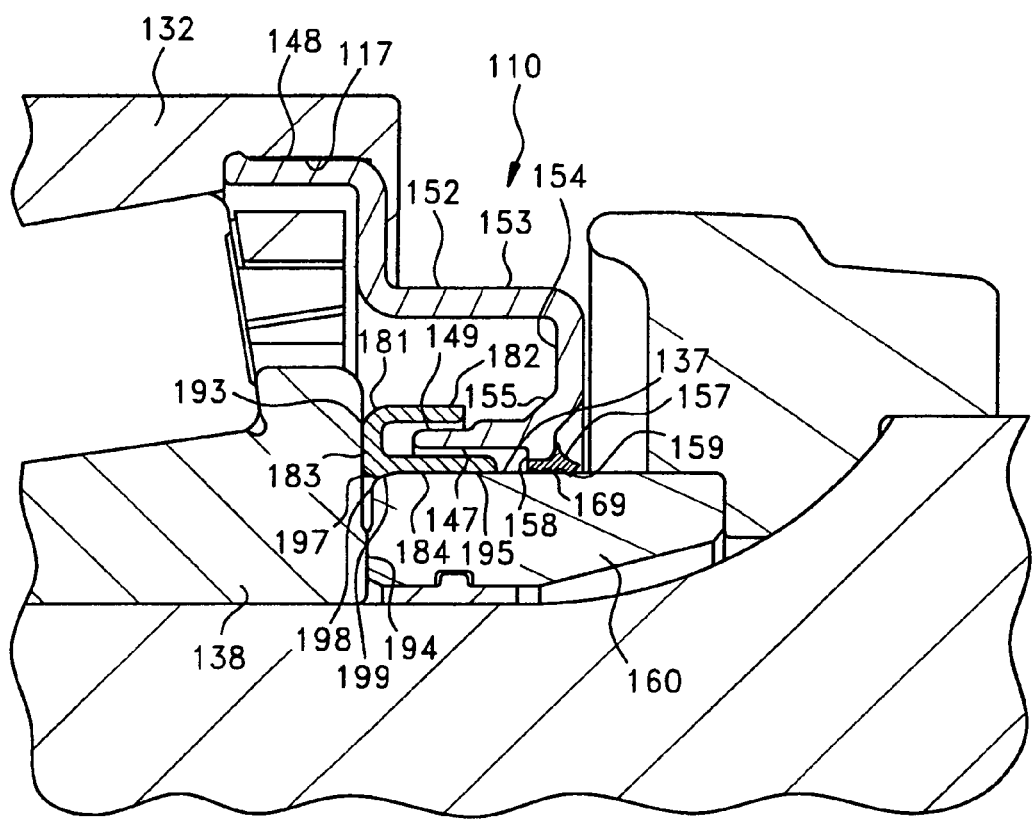
FIG. 3 is a detailed view in partial cross section of a tapered roller bearing assembly in accordance with a second embodiment of the present invention.

Referring now to FIG. 3. a detailed view of a second embodiment of a seal assembly portion of bearing assembly 110 is provided. Seal section 152 is seen to comprise a generally circular piece, having a larger diameter end section 148 pressed or fit into a complementary counterbore 117 in cup 132. Seal section 152 includes a main cylindrical section 153 that extends parallel to end section 148, wherein main cylindrical section 153 has a smaller diameter than end section 148.

An inner circular section 154 is normal to main cylindrical section 153 and extends inwardly toward wear ring 160. Angled section 155 of seal section 152 extends from inner circular section 154 at an acute angle thereto. Resilient sealing element 157 is fitted onto protrusion 158 of angled section 155. Resilient sealing element 157 is comprised of a rubber or elastomer compound, such as Nitrile rubber compound. Resilient sealing element 157 includes a main section that includes an opening to receive protrusion 158 of seal assembly 152. Resilient sealing element 157 also includes base circular contact rib 159 that is laterally spaced from two base ribs 169. Accordingly, a space exists between end contact rib 159 and base contact ribs 169.

A stator section 147 is a generally cylindrical piece, having an outer section 149 with an indented surface. The stator section 147 extends from angled section 155 of seal case 152 and is formed in the same process or operation.

Rotor 181 is seen to be a generally cylindrical piece having an outer section 182 of a larger diameter. Intermediate section 183 extends from outer section 182 and is generally normal thereto. Intermediate section 183 includes a generally flat outer section 193 that is fitted against a complementary flat surface 194 of bearing cone 138. Inner section 184 of rotor 181 extends from intermediate section 183 and is generally normal thereto. Inner section 184 of rotor 181 has an outer surface 195 which is fitted against outer surface 137 of wear ring 160.

Outer surface 195 of rotor 181 is welded, glued, or interference fitted to outer surface 137 of wear ring 160. A bead or rib 197 or other affixing media can be located at a corner between intermediate section 183 of rotor 181 and outer surface 195 of inner section 184 of rotor 181 to affix to outer surface 137 of wear ring 160. Chamfer 198 in outer surface 137 of wear ring 160 aids the bead or rib 197 with location to outer surface 137.

The combination and configuration of seal section 152, including stator section 147 and rotor 181 assist in retaining lubricant within the seal assembly. As rotor 181 inner section 184 and outer section 182 rotate about stator 147 outer section 149, the path required for lubricant to escape from within the seal assembly is torturous. Preferably, stator 147 outer section 149 extends about halfway into the channel formed by rotor outer section 182 and inner section 184, but such extension could be from 25% to 75% or more. The presence of resilient sealing element 157 further restricts the lubricant from exiting the seal assembly. The preferred spacing between rotor 181 section 184 and stator 147 outer section 149 is nominal (0.076 cm) 0.030 inch and between stator 147 outer section 149 and rotor 181 outer section 182 is a nominal (0.076 cm) 0.030 inch. It should be understood that seal case 152 itself is normally comprised of suitable steel, as are rotor 181. However, it is within the scope of the present invention to have one or more of seal section 152, rotor 181 comprised of an engineered thermoplastic such as polyester or composite material.

It should be understood that seal section 152 and stator 147 can be a unitary component.

What is claimed is:

1. A roller bearing assembly comprising
a cone having an outwardly directed raceway thereon,
a cup having an inwardly directed raceway thereon,
the cone having a generally flat, radially outward face,
the cup having an inwardly facing cylindrical counterbore,
a wear ring adjacent the cone, the wear ring having a cylindrical outer surface, a seal section having a generally cylindrical configuration, the seal section including a first end section received in the inwardly facing cylindrical counterbore of the cup, the seal section having a second end section, a resilient sealing element affixed to the second end section of the seal section such that the resilient sealing element contacts the cylindrical outer surface of the wear ring, a rotor element of generally cylindrical shape, the rotor element comprising an outer section, a intermediate section and an inner section, the inner section of the rotor element having an outer surface affixed to the cylindrical outer surface of the wear ring, and a stator element of a generally cylindrical shape, the stator element comprising an outer section, an intermediate section and an inner section, the outer section of the stator element having an outer surface affixed to or molded integral to the seal section, the inner section of the stator element extending between the outer section and the inner section of the rotor element.

2. The roller bearing assembly of claim 1 wherein the rotor element intermediate section is generally normal to the outer section and to the inner section to form a channel shaped structure, and wherein the intermediate section of the rotor element has a generally flat outer surface that abuts the generally flat, radially outward face of the cone.

3. The roller bearing assembly of claim 1 wherein the rotor element intermediate section is generally normal to the outer section and to the inner section to form a channel shaped structure, and wherein the inner section of the stator element extends part way into the channel shaped structure of the rotor element.

4. The roller bearing assembly of claim 1 wherein the resilient sealing element includes a first contact rib extending into contact with the cylindrical outer surface of the wear ring, and second and third contact ribs spaced from the first contact rib extending into near contact with the cylindrical outer surface of the wear ring.

5. The roller bearing assembly of claim 1 wherein the intermediate section of the stator extends from the outer section at an outward angle, and the resilient sealing element includes an inner edge extending in close proximity to the intermediate section of the stator.

6. The roller bearing assembly of claim 1 wherein the cylindrical outer surface of the wear ring includes a chamfer, and the intermediate section of the rotor element includes a protrusion that extends into the chamfer in the wear ring.

7. A bearing assembly comprising:

a bearing cone including an outwardly directed raceway, a bearing cup including a tapered inward directed raceway located in radially outwardly spaced relation to the bearing cone raceway, and rolling elements located between the inner and outer raceways, the bearing cup having an inwardly facing cylindrical counterbore, a backing ring having an inwardly directed counterbore formed therein defining an axial shoulder, a wear ring having a cylindrical outer surface, a seal case having a first end portion received in interference relation within the cylindrical counterbore in the bearing cup and a second end portion, a resilient seal affixed to the second end portion of the seal ring, the resilient seal contacting the cylindrical surface of the wear ring, a rotor element of a generally cylindrical shape, the rotor element comprising an outer section, a intermediate section and an inner section, and a stator element of a generally cylindrical shape, the stator element comprising an outer section, an intermediate section and an inner section, the outer section of the stator element having an outer surface affixed to or molded integral to the seal section, the inner section of the stator element extending between the outer section and the inner section of the rotor element.

8. The roller bearing assembly of claim 7 wherein the rotor element intermediate section is generally normal to the outer section and to the inner section to form a channel shaped structure, and wherein the intermediate section of the rotor element has a generally flat outer surface that abuts the generally flat, radially outward face to the cone.

9. The roller bearing assembly of claim 7 wherein the rotor element intermediate section is generally normal to the outer section and to the inner section to form a channel shaped structure, and wherein the inner section of the stator element extends part way into the channel shaped structure of the rotor element.

10. The roller bearing assembly of claim 7 wherein the resilient sealing element includes a first contact rib extending into contact with the cylindrical outer surface of the wear ring, and a second and third contact rib spaced from the first contact rib, with the second and third contact rib extending into near contact with the cylindrical outer surface of the wear ring.

11. The roller bearing assembly of claim 7 wherein the intermediate section of the stator extends from the outer section at an acute angle, and the resilient sealing element includes an inner edge extending near parallel to the intermediate section of the stator, with the inner edge of the resilient sealing element in close proximity to the intermediate section of the stator.

12. The roller bearing assembly of claim 7 wherein the cylindrical outer surface of the wear ring includes a chamfer, and the intermediate section of the rotor element includes a protrusion that extends into the chamfer in the wear ring.

13. The roller bearing assembly of claim 7 wherein the space between the inner section of the stator element and the outer section of the rotor element is about (0.076 cm) 0.030 inch and the space between the inner section of the stator element and the inner section of the rotor element is about (0.076 cm) 0.030 inch.

14. The roller bearing assembly of claim 7 wherein the inner section of the stator element extends a minimum of about one half the distance into the channel shaped structure of the rotor element.

15. A roller bearing assembly comprising a cone having an outwardly directed raceway thereon, a cup having an inwardly directed raceway thereon, the cone having a generally flat, radially outward face, the cup having an inwardly facing cylindrical counterbore, a wear ring adjacent the cone, the wear ring having a cylindrical outer surface, a seal section having a generally cylindrical configuration, the seal section including a first end section received in the inwardly facing cylindrical counterbore of the cup, the seal section having a second section, a resilient sealing element affixed to the second section of the seal section such that the resilient sealing element contacts the cylindrical outer surface of the wear ring, a rotor element of generally cylindrical shape, the rotor element comprising an outer section, a intermediate section and an inner section, the inner section of the rotor element having an outer surface affixed to the cylindrical outer surface of the wear ring, and a stator element of a generally cylindrical shape, the stator element extending from the second section of the seal section, the stator element extending between the outer section and the inner section of the rotor element.

16. The roller bearing assembly of claim 15 wherein the rotor element intermediate section is generally normal to the outer section and to the inner section to form a channel shaped structure, and wherein the intermediate section of the rotor element has a generally flat outer surface that abuts the generally flat, radially outward face of the cone.

17. The roller bearing assembly of claim 15 wherein the rotor element intermediate section is generally normal to the outer section and to the inner section to form a channel shaped structure, and wherein the inner section of the stator element extends part way into the channel shaped structure of the rotor element.

18. The roller bearing assembly of claim 15 wherein the resilient sealing element includes a first contact rib extending into contact with the cylindrical outer surface of the wear ring, and second and third contact ribs spaced from the first contact rib extending into near contact with the cylindrical outer surface of the wear ring.

19. The roller bearing assembly of claim 15 wherein the resilient sealing element is fitted onto the protrusion of the seal section.

20. The roller bearing assembly of claim 15 wherein the cylindrical outer surface of the wear ring includes a chamfer, and the rotor element includes a protrusion that extends into the chamfer in the wear ring.

21. The roller bearing assembly of claim 15 wherein the seal section and stator are manufactured as one component.

22. The roller bearing assembly of claim 15 wherein the space between the inner section of the stator element and the outer section of the rotor element is about (0.076 cm) 0.030 inch and the space between the inner section of the stator element and the inner section of the rotor element is about (0.076 cm) 0.030 inch.

23. The roller bearing assembly of claim 15 wherein the inner section of the stator element extends a minimum of about one half the distance into the channel shaped structure of the rotor element.

* * * * *